H. P. WALLACE.
FENDER FOR FIREPLACES.
APPLICATION FILED MAY 7, 1917.
1,253,446.
Patented Jan. 15, 1918.
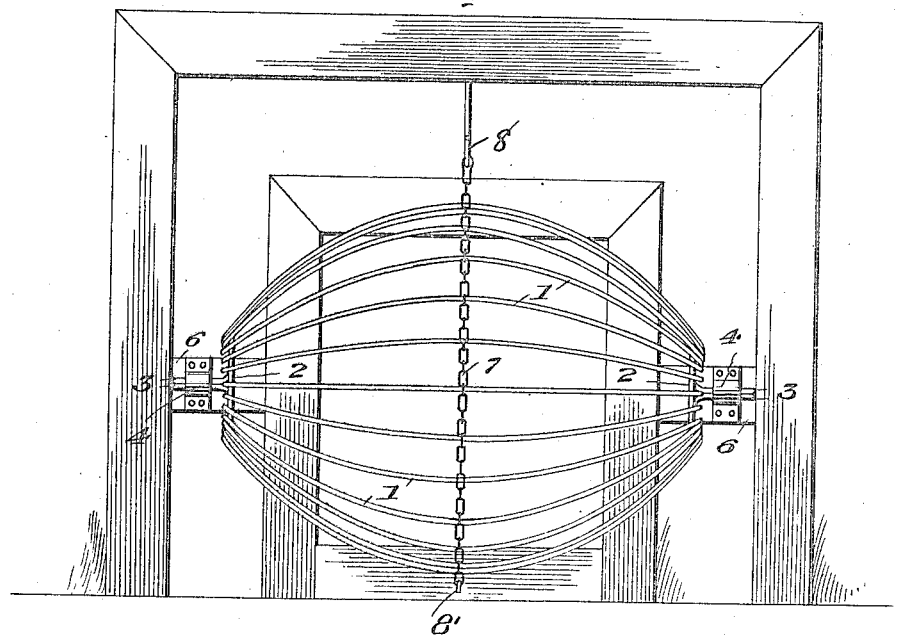
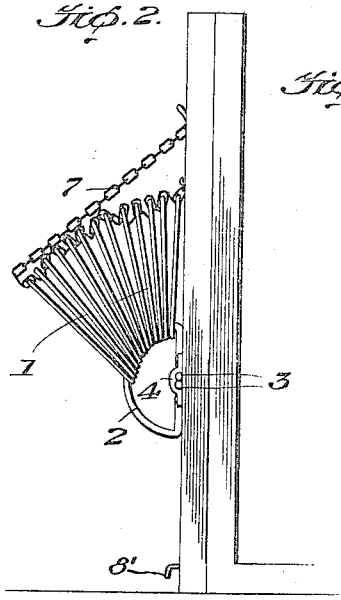
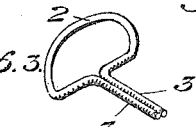
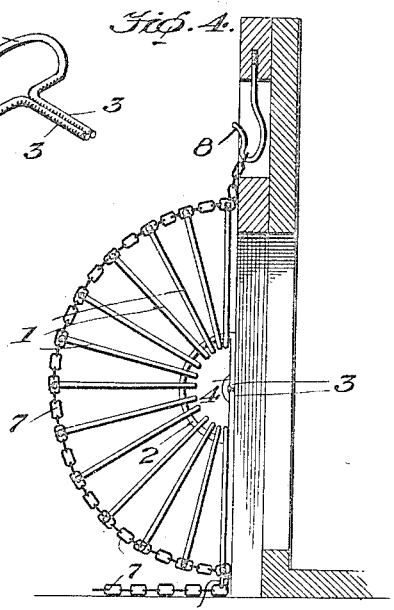
Inventor
HENRY P. WALLACE.
by Louis Bagger & Co.
his Attorneys

UNITED STATES PATENT OFFICE.

HENRY P. WALLACE, OF BUTLER, GEORGIA.

FENDER FOR FIREPLACES.

1,253,446.   Specification of Letters Patent.   Patented Jan. 15, 1918.

Application filed May 7, 1917. Serial No. 167,021.

*To all whom it may concern:*

Be it known that I, HENRY P. WALLACE, a citizen of the United States, residing at Butler, in the county of Taylor and State of Georgia, have invented certain new and useful Improvements in Fenders for Fireplaces, of which the following is a specification.

My invention relates to an improvement in fenders for fire-places, and the object is to provide a collapsible, as well as a removable, fender, more particularly for keeping persons from getting sufficiently close to the fire to get burnt.

With the foregoing object in view, this invention comprises a fender composed of curved rods or wires having sliding connection at each end upon outstanding removable loops, in connection with a chain or other flexible device loosely connected with the wires at or near their centers, as a means for holding the wires forming the fender spaced apart, and for raising, lowering, and fastening them in operative or inoperative position.

In the accompanying drawings:—

Figure 1 is a front view;

Fig. 2 is a side view;

Fig. 3 is a detail in perspective of one of the bearing-brackets; and

Fig. 4 is a sectional view.

The fender comprises some ten or twelve curved rods or bars 1, 1, preferably made of galvanized, bronzed, or other non-corrosive wire. These are curved, and at their ends bent loosely around loops 2 of the end support bearing brackets, the shanks 3, 3, of which are removably secured in sockets 4, 4, secured at the opposite sides of the fire-place on blocks 6, 6, or the wood-work or other support.

A chain or equivalent device 7 connects and holds apart the various wires of the fender at the center, and these wires or rods are connected with the chain in any approved manner, as, for instance, by passing through links at predetermined distances apart, as shown in Fig. 4 of the drawings.

The ends of the chain are left sufficiently long to loop over a hook 8 depending from the mantel or other support above the fireplace, and the lower end to fasten over a hook 8' at the bottom, and also to pass over the hook 8 at the top when the fender is raised to put in fuel, or clear out the fireplace.

A fender of this type will also prevent sparks from flying out into the room, more or less, or could be made to absolutely prevent this, if desired, by placing the bars or wires sufficiently close together. As it is, it is preferable to make them about two inches apart at the center, although this, of course, is subject to indefinite variation, as are the other proportions and the material of which the bars are made.

More or less slight changes might be made in the form and arrangement of the several parts described without deviating from the invention; hence I do not wish to be limited to the precise construction set forth, but:—

I claim:

1. A fender composed of bearing brackets, bowed bars loosely connected with the brackets, and a flexible device connecting these bars together and forming spacing means, the ends of the flexible device extending sufficiently beyond the bars to afford a means for supporting and fastening the fender at the center.

2. A fender comprising bowed bars or rods having loops at their ends, removably supported brackets with which they have sliding, pivotal connection, and flexible means connecting the bars at or near their center.

3. A fender comprising bowed bars or rods having loops at their ends, removably supported brackets with which they have sliding, pivotal connection, and flexible means connecting the bars at or near their center, the ends of said flexible connections extending beyond the bars for fastening the latter either in an open or closed position.

4. A fender comprising bowed bars and removably supported brackets with which the ends of the bars have pivotal sliding connection, and a chain loosely connecting the center of the bars as a means for holding them spaced and for opening and closing the fender.

5. A fender comprising bowed bars and removably supported brackets with which the ends of the bars have pivotal sliding connection, and a chain loosely connecting the centers of the bars as a means for holding them spaced, and for opening and closing the fender, the ends of said flexible connection being extended beyond the top and bottom of the fender as a means for fastening the latter.

In testimony whereof I affix my signature.

HENRY P. WALLACE.

Copies of this patent may be obtained for five cents each, by addressing the "Commissioner of Patents, Washington, D. C."